US010358825B2

(12) United States Patent
Omli et al.

(10) Patent No.: US 10,358,825 B2
(45) Date of Patent: Jul. 23, 2019

(54) FASTENER CAP FOR LUMBER WRAP

(71) Applicant: Allan Omli, LLC., Winston Salem, NC (US)

(72) Inventors: Allan T. Omli, Winston-Salem, NC (US); Douglas K. Omli, Lewisville, NC (US)

(73) Assignee: Allan Omli, LLC, Winston-Salem, NC (US)

( * ) Notice: Subject to any disclaimer, the term of this patent is extended or adjusted under 35 U.S.C. 154(b) by 0 days.

(21) Appl. No.: 15/576,998

(22) PCT Filed: Jun. 1, 2016

(86) PCT No.: PCT/US2016/035207
§ 371 (c)(1),
(2) Date: Nov. 27, 2017

(87) PCT Pub. No.: WO2016/196586
PCT Pub. Date: Dec. 8, 2016

(65) Prior Publication Data
US 2018/0163406 A1 Jun. 14, 2018

Related U.S. Application Data

(60) Provisional application No. 62/169,842, filed on Jun. 2, 2015.

(51) Int. Cl.
E04D 1/34 (2006.01)
F16B 15/08 (2006.01)
F16B 15/00 (2006.01)

(52) U.S. Cl.
CPC ............ E04D 1/34 (2013.01); F16B 15/0015 (2013.01); F16B 15/08 (2013.01); E04D 2001/3423 (2013.01)

(58) Field of Classification Search
CPC ............... E04D 1/34; E04D 2001/3423; F16B 15/0015; F16B 15/08; F16B 43/001; D21H 19/34
(Continued)

(56) References Cited

U.S. PATENT DOCUMENTS 4,174,596 A * 11/1979 Deibele .................... A01G 9/22
52/202
5,635,279 A 6/1997 Ma et al.
(Continued)

FOREIGN PATENT DOCUMENTS

JP 2001-140847 A 5/2001
JP 2002-168218 A 6/2002

OTHER PUBLICATIONS

International Search Report, PCT/US2016/035207, dated Aug. 24, 2016.

Primary Examiner — Brent W Herring
(74) Attorney, Agent, or Firm — Massey Law, PLLC; Carl B. Massey, Jr.

(57) ABSTRACT

A fastener cap assembly for securing protective wrap to lumber includes a plurality of fastener caps spaced from one another by breakable tabs along a first axis extending through a center of the fastener caps, with each of the fastener caps and breakable tabs comprising a substrate formed from a paper-based material. The fastener cap assembly further includes a groove extending across a center portion of the breakable tabs and penetrating inward from the top surface of the breakable tabs to a predetermined depth, and a protective material applied to at least the top surfaces of the substrates that forms a non-waxy and moisture-resistant protective barrier when cured.

19 Claims, 3 Drawing Sheets

(58) Field of Classification Search
USPC .................................. 52/698; 411/439, 500
See application file for complete search history.

(56) References Cited

U.S. PATENT DOCUMENTS

| | | | | |
|---|---|---|---|---|
| 5,947,362 | A * | 9/1999 | Omli | B25C 5/1693 |
| | | | | 227/120 |
| 6,145,725 | A * | 11/2000 | Omli | B25C 5/1693 |
| | | | | 227/120 |
| 6,293,744 | B1 * | 9/2001 | Hempfling | F16B 33/004 |
| | | | | 411/372.5 |
| 7,207,095 | B2 * | 4/2007 | Bruins | F16B 15/08 |
| | | | | 206/343 |
| 10,138,919 | B2 * | 11/2018 | Mathieson | E04D 3/3606 |
| 2005/0265807 | A1 * | 12/2005 | Bruins | F16B 15/08 |
| | | | | 411/480 |
| 2009/0050664 | A1 | 2/2009 | Henza | |
| 2009/0308906 | A1 * | 12/2009 | Lamb | B25C 5/1693 |
| | | | | 227/119 |
| 2011/0083396 | A1 | 4/2011 | Shelton et al. | |
| 2015/0322995 | A1 * | 11/2015 | Omli | F16B 43/00 |
| | | | | 411/371.1 |
| 2017/0218997 | A1 * | 8/2017 | Mathieson | E04D 3/3606 |

* cited by examiner

FASTENER CAP FOR LUMBER WRAP

CROSS-REFERENCE TO RELATED APPLICATIONS

This application claims the benefit of U.S. Provisional Patent Application No. 62/169,842, filed on 2 Jun. 2015, and entitled "FASTENER CAP FOR LUMBER WRAP," which application is incorporated by reference in its entirety herein, and for all purposes.

TECHNICAL FIELD

This application relates generally to protective systems for the lumber industry, and more specifically to fastener caps that can be used to secure protective wraps to lumber and other wood-based products.

BACKGROUND

Fastener caps are often used in the lumber industry to secure protective plastic sheeting or wraps to exposed loads of slumber during transportation and storage. The fastener caps are generally the same type of fastener caps used in the roofing industry to secure an overlayment, such as asphalt shingles, plastic sheeting, or metallic roof panels, to the underlying plywood of the roof deck. Roofing fastener caps are typically made from a hard plastic material that is thick enough to prevent the head or crown of a fastener from pulling through the fastener cap, and conformable enough to seal around the body of the fastener to prevent moisture from seeping into the aperture created by the fastener. In addition, when linked together as a fastener cap assembly, the roofing fastener caps can be automatically applied to the roofing surface with a fastener driving tool or nail gun. Unfortunately, however, when roofing fastener caps are used to secure protective wrap over lumber that is destined for reduction into wood pulp, the plastic caps often fall into the process intake when the lumber wrap is removed, thereby contaminating the pulp stream.

What is needed is a fastener cap and fastener cap assembly made from a more pulp-friendly material that will still reliably secure the protective plastic wrap to the load of lumber and prevent pull-through of the fastener head or crown, even when subjected to harsh outdoor conditions such as rain, snow, sleet and ice, and over time to UV exposure from sunlight. It is toward such a fastener cap and fastener cap assembly that the present invention disclosure is directed.

SUMMARY

Briefly described, one embodiment of the present disclosure includes a fastener cap assembly for securing protective wrap to lumber that includes a plurality of fastener caps spaced from one another by breakable tabs along a first axis extending through a center of the fastener caps, with each of the fastener caps and breakable tabs comprising a substrate formed from a paper-based material and a protective material applied to at least the top surfaces of the substrates that cures to form a non-waxy and moisture-resistant protective barrier. Both the substrate and the protective barrier are degradable within a pulp manufacturing process.

In another embodiment of the disclosure, a repulpable fastener cap comprises a substrate formed from dried paper-based material having a predetermined thickness and strength sufficient to secure a protective plastic wrap to a load of lumber when a fastener, such as staple or nail, is driven through the center of the fastener cap. A protective material is applied to the substrate to maintain the structural integrity of the substrate in a wet environment, with both the substrate are protective material being degradable within a pulp manufacturing process.

The invention will be better understood upon review of the detailed description set forth below taken in conjunction with the accompanying drawing figures, which are briefly described as follows.

Those skilled in the art will appreciate and understand that, according to common practice, various features of the drawings discussed below are not necessarily drawn to scale, and that dimensions of the various features and elements of the drawings may be expanded or reduced to more clearly illustrate the embodiments of the present disclosure described herein.

DETAILED DESCRIPTION

Generally described, the present disclosure relates to a pulp-friendly fastener cap and fastener cap assembly for securing protective plastic sheeting or wrap to a load of lumber or similar wood products. As discussed below, the fastener cap can provide significant advantages and benefits over other types of fastener caps currently used in the lumber industry. However, the recited advantages are not meant to be limiting in any way, as one skilled in the art will appreciate that other advantages may also be realized upon practicing the present disclosure. It will also be appreciated that the pulp-friendly fastener cap may not be limited only to uses relating to the lumber industry, and that other uses and applications are possible and considered to fall within the scope of the present disclosure.

Figure 1:
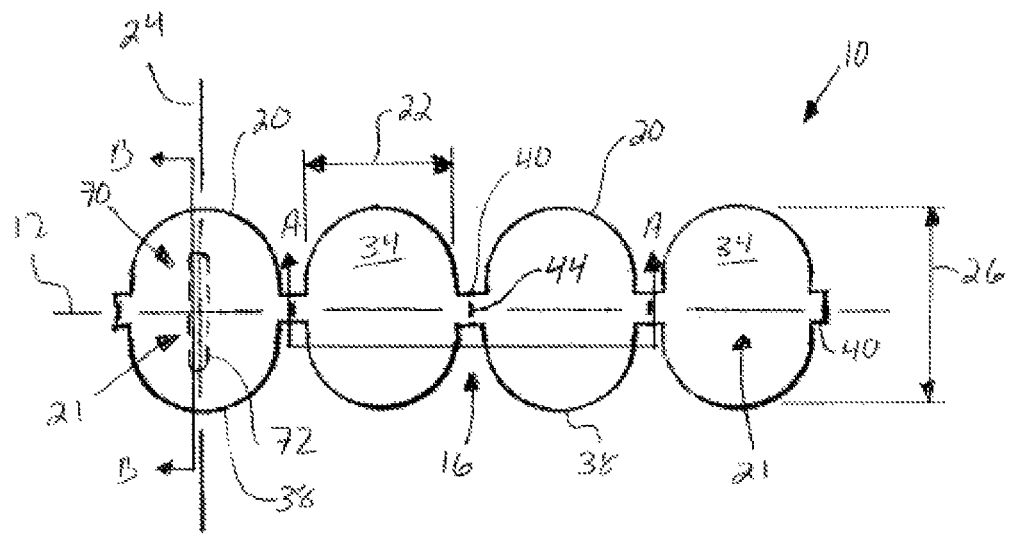
FIG. 1 is a plan view of a fastener cap assembly, in accordance with one representative embodiment of the present disclosure.

Referring now in more detail to the drawing figures, wherein like parts are identified with like reference numerals throughout the several views, FIG. 1 illustrates one embodiment of a fastener cap assembly 10 for providing a plurality of fastener caps to a fastener driving tool or nail/staple gun. The fastener cap assembly 10 generally comprises a plurality of fastener caps 20 that are spaced from one another along a first or centerline axis 12 that extends through the center portions 21 of the fastener caps 20. Each fastener cap 20 can have a cap width 22 along the first axis as well as a cap length 26 along a second axis 24 that is orthogonal or perpendicular to the first axis 12.

In one aspect the cap length 26 can be different than the cap width 22 to form a fastener cap having a non-round or oblong shape. As shown in FIG. 1, for instance, the cap length 26 can be greater than the cap width 22, so that the second or long axes 24 of the oblong fastener caps 20 are perpendicular to the first or centerline axis 12 of the fastener cap assembly 10. It will be appreciated that arranging the long axes 24 of the oblong fastener caps 20 perpendicular to the centerline axis 12 of the assembly can be useful for increasing the number of fastener caps 20 in any predetermined length of the fastener cap assembly 10 over other fastener cap assemblies of equal length that may be found in the prior art. Nevertheless, other configurations and arrangements, such as with the long axes of the oblong fastener caps being parallel to the first or centerline axis of the fastener cap assembly, are also contemplated and considered to fall within the scope of the present disclosure.

In some aspects the cap length 26 can be at least one and a half times the cap width 22 so as to maintain a desired minimum distance between the ends of the elongate crown 72 of an installed staple 70 (shown in outline) and the side edges 38 of the fastener cap 20, such as when the staple is driven through the center portion 21 of the fastener cap 20 with the fastener driver tool described above. This can be particularly useful for increasing the surface area, and in this case the hold-down force, that is provided by the fastener cap 20 to secure a lumber wrap or sheet to a load of lumber.

In addition, each fastener cap 20 in the fastener cap assembly 10 can be releasably connected by one or more breakable tabs 40 to an adjacent fastener cap. For example, single breakable tabs 40 can be aligned along the first or centerline axis 12 of the fastener cap assembly 10, as shown in FIG. 1, to bridge the gaps 16 between fastener caps and to connect each adjacent pair of fastener caps 20. The breakable tabs 40 are not limited to the configuration illustrated in FIG. 1, however, and in other embodiments (not shown) the tabs may be offset to either side of the centerline axis in alternating fashion, or may be offset from the centerline axis in opposite directions on either side of every other fastener cap. Alternatively, sets of two breakable tabs can also be spaced from centerline axis, one in each direction, to connect each adjacent pair of fastener caps.

Figure 2:
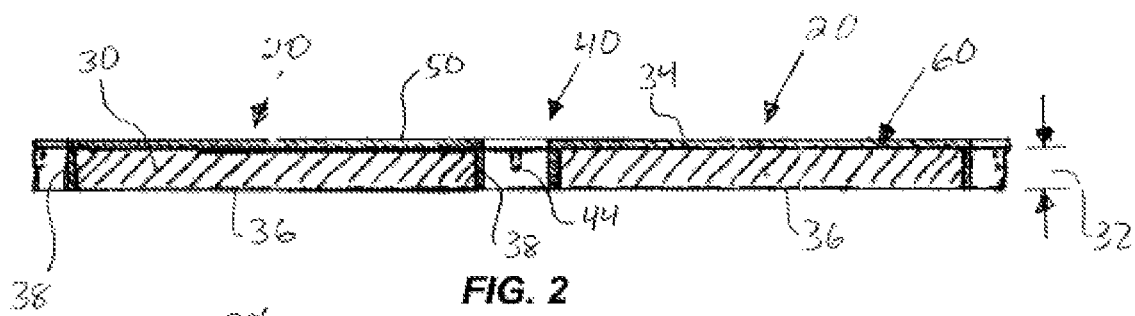
FIG. 2 is a cross-sectional side view of the fastener cap assembly, as viewed from section line A-A of FIG. 1.

As shown in FIG. 2, the assembly 10 of fastener caps 20 and breakable tabs 40 can comprise a paper-based substrate 30, such as a recycled or virgin coated paper material, having a substantially uniform thickness 32. This can allow the fastener cap assembly 10 to be manufactured in a high-volume production process such as die cutting. In some aspects the thickness 32 of the paper-based substrate can be 24 point (0.024 inch) or 28 point (0.028 inch), while in other aspects the thickness 32 of the paper-based substrate 30 can range from about 0.018 inch to about 0.040 inch. As will be appreciated by the skilled artisan, the paper-based substrate 30 can be degraded or dissolved within the pulp manufacturing process without contaminating the pulp stream.

Figure 3:
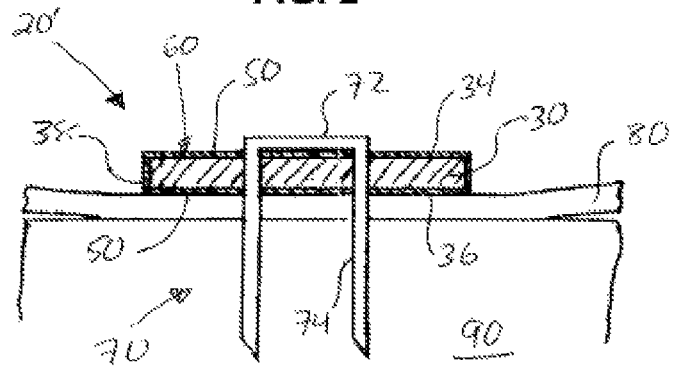
FIG. 3 is a cross-sectional side view of a fastener cap after attachment to a load of lumber with a staple, as viewed from section line B-B of FIG. 1.

The paper-based substrate 30 can also be coated with a protective water and moisture resistant coating 50 that prevents foreign liquids or vapors from coming into direct contact with and being absorbed by the underlying substrate 30. In one aspect the protective coating 50 can be a water, moisture, and chemical resistant over-print varnish, such as OPV 909 T MR [TM], that is a commercially-available coating developed for the food packaging industries by UV Technologies located in High Point, N.C. In other embodiments plant-based recyclable and water-resistant coatings that are non-petroleum based, non-waxy, and formaldehyde-free, such as a lignin-based coating material and the like, can also be used to make the outer protective layer. In addition to preventing liquids and vapors from coming into the direct contact the paper-based substrate 30, the protective coating 50 can also provide the fastener cap 20 with additional hardness and rigidity that, in one aspect, can help prevent the crown 72 of the staple 70 (or head of a nail) from breaking through or tearing the fastener cap 20' when the staple 70 (or nail) and the fastener cap 20' are driven together against the protective wrap 80 that covers a load of lumber 90, as illustrated in FIG. 3. Like the paper-based substrate 30 described above, the protective coating 50 can also be degraded or dissolved within the pulp manufacturing process without contaminating the pulp stream.

In some aspects the protective coating 50 can also include a UV protective component that protects the underlying substrate 30 from damage resulting from continued exposure to the UV rays found in sunlight. Furthermore, depending on the porosity and/or pre-coating of the substrate 30, in one embodiment the coating 50 can be substantially absorbed into the paper prior to curing the coating material, thereby maintaining or only slightly increasing the original thickness 32 of the substrate 30. In other embodiments the protective coating 50 can merely adhere to the exposed surfaces of the substrate 30 without substantially penetrating into the paper-based material, and subsequently cure into a hard water and moisture resistant shell having a predetermined thickness that can range, in one aspect, from about 0.002 inch to about 0.010 inch.

Also visible in FIGS. 1 and 2, the breakable tabs 40 can be formed with a perforation or groove 44 that extends across a center portion of the breakable tabs 40 and inward from the top surface 34 for a predetermined distance. The grooves 44 can be substantially perpendicular to the centerline axis 12 of the assembly 10, as illustrated. Alternatively, the grooves can be formed at any relative to the centerline axis, including but not limited to parallel with the centerline axis. The groove 44 can weaken the paper-based substrate 30 in the region of the breakable tabs so that the fastener caps 20 can easily separate from each other when pulled and/or twisted apart manually or sheared with a fastener driver tool. In one aspect the predetermined depth of the groove 44 can be about ⅓ the total thickness 32 of the substrate 30 (or about 0.010 inch for a paper-based substrate 30 of about 0.028 inch) or more.

In one aspect of the present disclosure illustrated in FIG. 2, the protective coating 50 can be applied the top surfaces 34 and edge surfaces 38 of the paper-based substrate 30 to form a protective shell that covers the most exposed surfaces, while leaving the bottom surfaces 36 of the substrate 30 uncoated. In another aspect shown in FIG. 3, the protective coating 50 can be applied to all of the exposed surfaces of the paper-based substrate 30 of the fastener cap 20', including the bottom surfaces 36.

Furthermore, ink printing 60 (FIG. 2) can be applied to any of the surfaces 35, 36, 38 of the substrate prior to application of the protective coating 50, as desired, with the ink being absorbed into the paper-based material. In this configuration the protective coating 50 can be substantially transparent so that the ink printing 60 is visible beneath the coating 50. In other aspects, however, the protective coating 50 can be opaque or tinted so that all of the coated surfaces have substantially the same color. Other coloring combinations for the underlying paper-based substrate 30, the ink printing 60 and the overlying protective coating 50 are also possible and considered to fall within the scope of the present disclosure.

Figure 4:
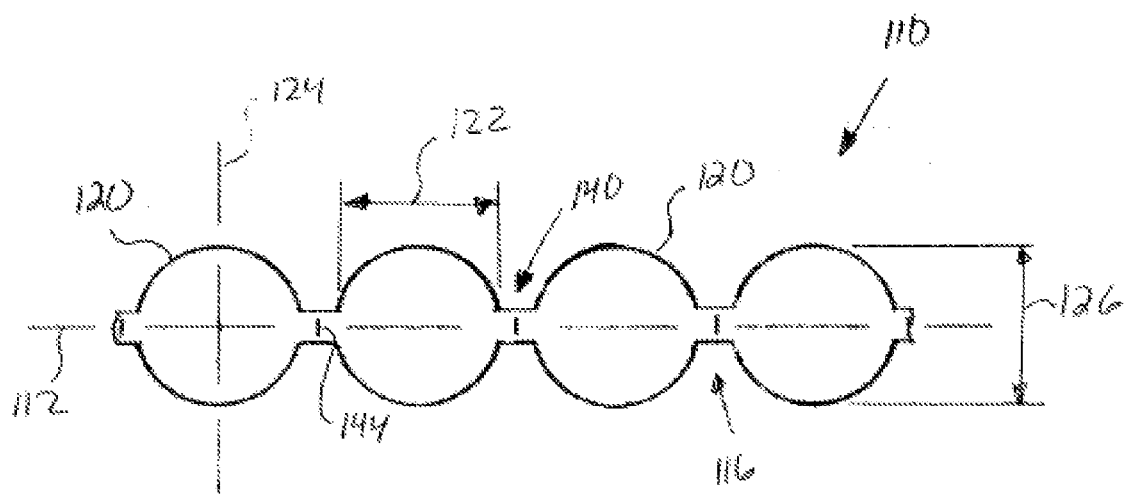
FIG. 4 is a plan view of a fastener cap assembly, in accordance with another representative embodiment.

It will be appreciated that neither the fastener caps nor the fastener cap assemblies is limited to the oblong shape or configuration shown in FIG. 1, and instead can be formed in a wide variety of shapes and configurations. For instance, FIG. 4 illustrates another embodiment of the fastener cap assembly 110, with each of the fastener caps having a round shape with a cap width 122 along the first axis 112 and a cap length 126 along a second axis 124 that are substantially equal. The fastener caps 120 can be releasably connected by one or more breakable tabs 140 that bridge the gaps 116 between adjacent fastener caps, and which can also include a perforation or groove 144 that extends across a center portion of the breakable tabs 140.

Figure 5:
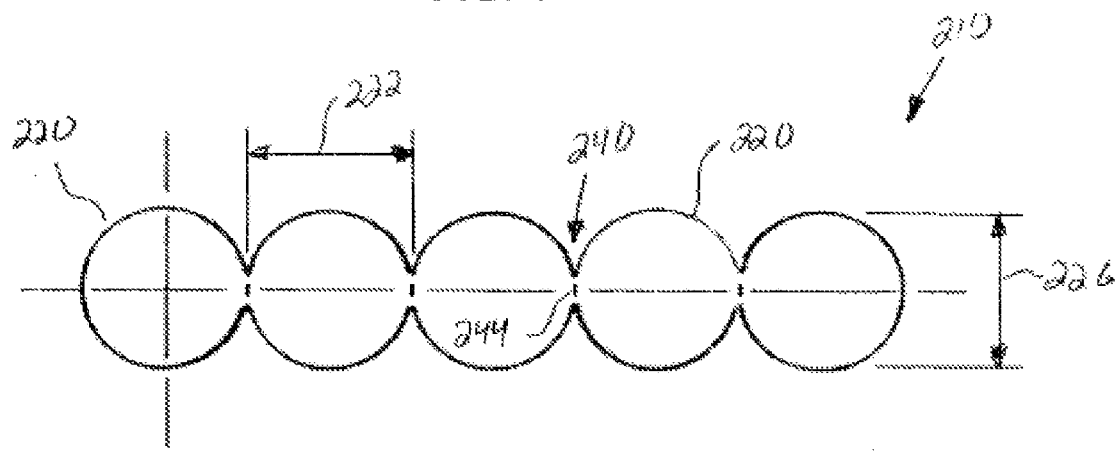
FIG. 5 is a plan view of a fastener cap assembly, in accordance with yet another representative embodiment.
Figure 6:
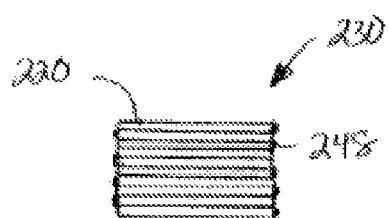
FIG. 6 is side view of stacked fastener caps from the fastener cap assembly of FIG. 5.

In other embodiments, such as the embodiment of the fastener cap assembly 210 illustrated in FIG. 5, the gap between adjacent fastener caps 220 may be reduced until the breakable tabs are replaced with a merged portion 240 that joins adjacent fastener caps 220. The merged portions 240 can also include a perforation or groove 244 that extends across a center portion of the merged portion 240 to facilitate the separation of the fastener caps from each other. As shown in FIG. 6, the fastener caps 220 in fastener cap assembly 210 can be separated from each other and combined into a stack 230 for loading into a fastener driver tool for application to a load of lumber. In one aspect the fastener caps 220 may have slightly rough edges 248 resulting from the torn merged portions.

Figure 7:
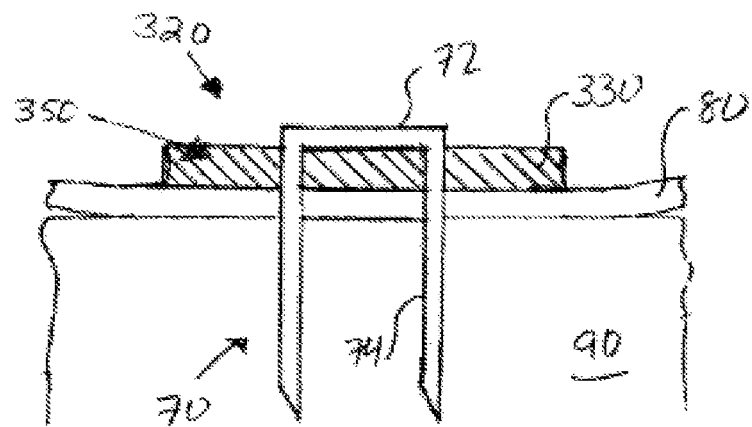
FIG. 7 is a cross-sectional side view of a fastener cap after attachment to a load of lumber with a staple, in accordance with another representative embodiment.

In another embodiment of the present disclosure shown in FIG. 7, the paper-based substrate 330 of the pulp-friendly fastener cap 320 can be impregnated with a natural or synthetic resin 350 that imbues the entire substrate 330 with water-resistant properties, so that the additional protective coating is not needed. The impregnated fastener cap 320 can have enough strength and durability to maintain its shape and prevent pull-through of the of the crown 72 of the staple 70 after exposure to rain, snow, sleet and ice, and over time to UV exposure from sunlight. In one aspect the resin can be a recyclable plant-based resin, such as PLA (polylactic acid) and the like, that is petroleum-free and formaldehyde-free, so that the fastener cap 320 can be easily broken up and dissolved during the pulp-making process.

Alternatively, the paper-based substrate of the pulp-friendly fastener cap can be impregnated with a repulpable wet strength resin, such as PAE (polyamide ephichlorohydrin) and the like, that allows the paper-based substrate to become saturated with moisture after exposure the elements, yet continues to provide the wet fastener cap with enough strength and durability to maintain its shape and prevent pull-through of the fastener head.

Figure 8:
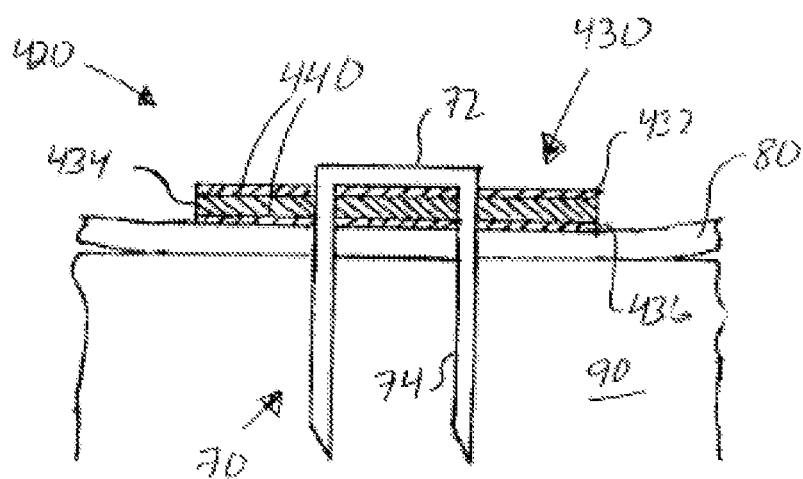
FIG. 8 is a cross-sectional side view of a fastener cap after attachment to a load of lumber with a staple, in accordance with yet another representative embodiment.

In yet another embodiment illustrated in FIG. 8, the pulp-friendly fastener cap 420 can comprise two or more plies 432, 434, 436 of paper-based substrates that are laminated together with a pulp-friendly adhesive 440, such as a lignin-based adhesive, and the like, to form a composite laminate fastener cap substrate 430. In addition, the various layers of the laminate substrate 430, especially the outer layers 432, 436, can be impregnated or coated or manufactured with any of the strengthening or protective materials described above. In this way one or more of the outer paper-based layers 432, 436 can form the protective barriers that shield one or more middle layers 434 that provide the fastener cap 420 with the desired strength and durability for preventing pull-through of the crown 72 of the staple 70, and thereby maintaining the lumber wrap 80 securely bound to the load of lumber 90. Since all of the materials that form the fastener cap 420 are pulp-friendly and recyclable, including the adhesive 440 used to laminate the various plies together, the entire fastener cap 420 can still be degraded or dissolved within the pulp manufacturing process without contaminating the pulp stream.

In summary, the pulp-friendly fastener caps and fastener cap assemblies of the present disclosure has been described in terms of preferred embodiments and methodologies considered by the inventors to represent the best mode of carrying out the invention. However, a wide variety of additions, deletions, and modification might well be made to the illustrated embodiments by skilled artisans within the scope of the invention. These and other revisions might be made by those of skill in the art without departing from the spirit and scope of the invention, which is constrained only by the following claims.

What is claimed is:

1. A repulpable fastener cap for securing protective wrap to lumber, the fastener cap comprising:
    a substrate formed from dried paper-based material having a top surface, a bottom surface, side edges, and a thickness between the top surface and the bottom surface of from about 0.018 inch to about 0.040 inch;
    wherein the repulpable fastener cap is substantially flat in use;
    wherein the repulpable fastener cap is adapted for inclusion in a fastener cap assembly for providing fastener caps to a fastener driving tool, and
    wherein the substrate is degradable within a pulp manufacturing process.

2. The fastener cap of claim 1, further comprising a protective material applied to the substrate to maintain the structural integrity of the substrate in a wet environment.

3. The fastener cap of claim 2, wherein the protective material, when cured, forms a hard outer coating layer having a thickness between about 0.002 inch and about 0.010 inch.

4. The fastener cap of claim 3, wherein the protective material is an over-print varnish.

5. The fastener cap assembly of claim 2, wherein the protective material further comprises a repulpable resin that impregnates the thickness of the substrate to imbue the paper-based material with water-resistant properties.

6. The fastener cap of claim 2, wherein the protective material further comprises a repulpable wet strength resin that maintains the structural integrity of the paper-based material when wet.

7. The fastener cap of claim 1, wherein the substrate further comprises a plurality of plies of paper-based material laminated together.

8. The fastener cap of claim 7, wherein the plurality of plies of paper-based material are laminated together with a lignin-based adhesive.

9. A fastener cap assembly for securing protective wrap to lumber, the fastener cap assembly comprising:
    a plurality of fastener caps spaced from one another by breakable tabs along a first axis extending through a center of the fastener caps, each of the fastener caps and breakable tabs comprising a substrate formed from paper-based material having a top surface, a bottom surface, side edges, and a thickness between the top surface and the bottom surface; and
    a perforation or groove extending across a center portion of the breakable tabs and penetrating inward from the top surface of the breakable tabs to a predetermined depth, wherein the substrate is degradable within a pulp manufacturing process, and wherein the thickness of the substrate is between about 0.018 inch and about 0.040 inch.

10. The fastener cap assembly of claim 9, further comprising a protective material applied to at least the top surfaces of the substrates, wherein the protective material, when cured, forms a non-waxy and moisture-resistant protective barrier.

11. The fastener cap assembly of claim 10, wherein the protective material, when cured, forms a hard outer coating layer having a thickness between about 0.002 inch and about 0.010 inch.

12. The fastener cap assembly of claim 11, wherein the protective material is an over-print varnish.

13. The fastener cap assembly of claim 10, wherein the protective material is applied prior to cutting the plurality of fastener caps from a sheet of paper-based material.

14. The fastener cap assembly of claim 10, wherein the protective material further comprises a repulpable resin that impregnates the thickness of the paper-based material to imbue the entire substrate with water-resistant properties.

15. The fastener cap assembly of claim 10, wherein the protective material is substantially transparent and the top surfaces of the substrates are printed underneath the protective coating.

16. The fastener cap assembly of claim 9, wherein the predetermined depth of the perforation or groove is equal to or greater than ⅓ of the thickness of the substrate.

17. The fastener cap assembly of claim 9, wherein the perforation or groove is substantially perpendicular to the first axis.

18. The fastener cap assembly of claim 9, wherein the substrate further comprises a plurality of plies of paper-based material laminated together.

19. The fastener cap assembly of claim 18, wherein the plurality of plies of paper-based material are laminated together with a lignin-based adhesive.

* * * * *